United States Patent
Sams (10) Patent No.: US 12,102,959 B1
(45) Date of Patent: Oct. 1, 2024

(54) SYSTEMS AND METHODS OF CARBON CAPTURE USING PRODUCED WATER

(71) Applicant: Cameron International Corporation, Houston, TX (US)

(72) Inventor: Gary W. Sams, Houston, TX (US)

(73) Assignee: CAMERON INTERNATIONAL CORPORATION, Houston, TX (US)

(*) Notice: Subject to any disclaimer, the term of this patent is extended or adjusted under 35 U.S.C. 154(b) by 0 days.

(21) Appl. No.: 18/584,563

(22) Filed: Feb. 22, 2024

(51) Int. Cl.
| | |
|---|---|
| *B01D 53/14* | (2006.01) |
| *B01D 53/18* | (2006.01) |
| *B01D 53/34* | (2006.01) |
| *B01D 53/62* | (2006.01) |
| *B01D 53/78* | (2006.01) |
| *C25B 1/04* | (2021.01) |
| *C25B 1/34* | (2006.01) |
| *C25B 15/08* | (2006.01) |

(52) U.S. Cl.
CPC ..... *B01D 53/1475* (2013.01); *B01D 53/1412* (2013.01); *B01D 53/1493* (2013.01); *B01D 53/18* (2013.01); *B01D 53/346* (2013.01); *B01D 53/62* (2013.01); *B01D 53/78* (2013.01); *C25B 1/04* (2013.01); *C25B 1/34* (2013.01); *C25B 15/081* (2021.01); *B01D 2251/604* (2013.01); *B01D 2252/103* (2013.01); *B01D 2257/504* (2013.01); *B01D 2258/0283* (2013.01)

(58) Field of Classification Search
CPC ............ B01D 53/1475; B01D 53/1412; B01D 53/1493; B01D 53/18; B01D 53/346; B01D 53/62; B01D 53/78; B01D 2251/604; B01D 2252/103; B01D 2257/504; B01D 2258/0283; C25B 15/081; C25B 1/04; C25B 1/34
USPC ....................................................... 423/220
See application file for complete search history.

(56) References Cited

U.S. PATENT DOCUMENTS

2015/0321914 A1* 11/2015 Darde ................ C01B 5/00
422/162
2021/0001270 A1* 1/2021 Lu .................... B01D 53/73

FOREIGN PATENT DOCUMENTS

WO  WO-2022187640 A1 * 9/2022

* cited by examiner

*Primary Examiner* — Anita Nassiri-Motlagh
(74) *Attorney, Agent, or Firm* — Jeffrey D. Frantz (57) ABSTRACT

Systems and methods for carbon capture using produced water are provided. One such system includes a direct air capture (DAC) subsystem. The DAC subsystem includes an air inlet configured to receive a flow of air comprising carbon dioxide, a water inlet configured to receive a flow of produced water from a production system. The DAC subsystem also includes one or more air-water contactors configured to contact the flow of air with the flow of produced water to dissolve carbon dioxide from the air into the produced water to produce a treated air and a water output, where the water output includes a carbon rich aqueous solution including dissolved carbon dioxide, carbonic acid, carbonate anions, bicarbonate anions, or a combination thereof.

12 Claims, 5 Drawing Sheets

SYSTEMS AND METHODS OF CARBON CAPTURE USING PRODUCED WATER

BACKGROUND

The present disclosure generally relates to systems and methods for capturing carbon using direct air capture and produced water from a production facility, such as an oil and/or gas facility.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

In production facilities, produced water is generated from various processes that use water to produce products. In oil and gas production facilities, water is co-produced with oil during extraction from reservoirs. The produced water varies in salinity based on a region of the world in which it is extracted. In some instances, oil and gas production facilities may treat the produced water to remove solids, oils, bacteria, and the like prior to use within the facility, disposal, or recycling. For example, onshore production facilities generally treat produced water and reinject treated water into reservoirs for pressure maintenance and/or disposal. One disadvantage of direct reinjection is that treated water is not fully leveraged during traditional treatment processes. For example, further treatment of the produced water may be of environmental importance to decrease levels of carbon in the atmosphere. For at least this reason, a need exists for developing systems and methods to leverage produced water treatment to increase environmental benefits of treating produced water.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system includes a direct air capture (DAC) subsystem. The DAC subsystem includes an air inlet configured to receive a flow of air comprising carbon dioxide, a water inlet configured to receive a flow of produced water from a production system. The DAC subsystem also includes one or more air-water contactors configured to contact the flow of air with the flow of produced water to dissolve carbon dioxide from the air into the produced water to produce a treated air and a water output, wherein the water output comprises a carbon rich aqueous solution comprising dissolved carbon dioxide, carbonic acid, carbonate anions, bicarbonate anions, or a combination thereof.

In certain embodiments, a method includes operating a production system to generate a flow of produced water, wherein the production system comprises a direct air capture (DAC) subsystem. The DAC subsystem includes one or more air-water contactors, controlling the DAC subsystem to receive a flow of air via an air inlet into the one or more air-water contactors, receive the flow of produced water via a water inlet into the one or more air-water contactors, and dissolve carbon dioxide from the air into the produced water via the one or more air-water contactors to produce a treated air and a water output, wherein the water output comprises a carbon rich aqueous solution comprising dissolved carbon dioxide, carbonic acid, carbonate anions, bicarbonate anions, or a combination thereof.

In certain embodiments, a system includes a direct air capture (DAC) subsystem, wherein the DAC subsystem includes an air inlet configured to receive a flow of air comprising carbon dioxide. The DAC subsystem also includes a water inlet configured to receive a flow of produced water from a production system and one or more air-water contactors configured to contact the flow of air with the flow of produced water to capture carbon dioxide from the air into the produced water to produce a treated air and a water output, wherein the water output comprises a carbon rich aqueous solution comprising dissolved carbon dioxide, carbonic acid, carbonate anions, bicarbonate anions, or a combination thereof. The system further includes an electrolysis subsystem, wherein the electrolysis subsystem is configured to receive the flow of produced water and produce an electrolysis hydroxide source, a hydrogen output, a chlorine output, or a combination thereof.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Oil and gas production facilities generate a produced water source as a product of executing processes, such as upstream production (e.g., exploration, production of crude oil and/or natural gas), midstream production (e.g., gas treatment and/or storage), downstream production (refining, and production of oil and natural gas products), and the like. The produced water source is traditionally treated to remove solids, oils, bacteria, and the like prior to disposal. In an offshore environment, the produced water source is released into the ocean provided it meets regulatory specifications. Onshore, the produced water source is treated and reinjected into a reservoir, such as a subsurface geological reservoir below the surface of the earth. In some instances, treated water can be returned to the reservoir it was initially sourced to facilitate pressure maintenance. In other instances, treated water is injected to a disposal well. At the present time, the produced water source is not leveraged for additional benefits before reinjection into the reservoir.

As discussed in detail below, the disclosed embodiments enable direct air capture (DAC) of undesirable gases (e.g., air pollutants or greenhouse gases) in the atmospheric air by capturing the undesirable gases in water (e.g., a produced water source from the oil and gas production facilities). The undesirable gases may include, but are not limited to, carbon-containing gases (e.g., carbon oxides or $CO_X$), such as a carbon dioxide ($CO_2$) and/or carbon monoxide (CO). Although the present application primarily discusses $CO_2$, the disclosed embodiments may be directed to any undesirable gases in the atmospheric air. For example, the undesirable gases may include carbon oxides ($CO_X$) such as $CO_2$ and CO, sulfur oxides ($SO_X$) such as sulfur dioxide ($SO_2$), nitrogen oxides (NOx) such as nitrous oxide ($N_2O$), or any combination thereof. Presently, the atmospheric $CO_2$ content is measured at approximately 410 ppmv. Although a variety of DAC systems may be used to capture undesirable gases from the air, existing DAC systems have relatively high operating costs (e.g., energy, chemicals, heat, etc.), particularly when designed as standalone DAC systems. With this in mind, the present disclosure is related to incorporating DAC systems within a context of an oil and gas production facility. As such, the present disclosure is directed towards leveraging the produced water source of the oil and gas production facilities to capture $CO_2$. In some embodiments, the produced water source may capture a quantity of $CO_2$ large enough to offset the $CO_2$ produced by the oil and gas production facility. In this manner, embodiments of the present disclosure may achieve near net-zero $CO_2$ emissions for the oil and gas production facility.

Accordingly, as discussed in detail below, certain embodiments of an oil and gas production system include a DAC subsystem configured to capture undesirable gases from the atmospheric air by dissolving the undesirable gases into the produced water source. For example, the DAC subsystem may capture one or more undesirable gases (e.g., $CO_2$) from an air source by dissolving the undesirable gases (e.g., $CO_2$) into the produced water source, because the undesirable gases (e.g., $CO_2$) are soluble in water. In this manner, the DAC subsystem may produce a DAC water output including produced water loaded with dissolved undesirable gases (e.g., captured undesirable gases, such as $CO_2$). In some embodiments, to capture additional $CO_2$ (e.g., in addition to readily dissolved $CO_2$) one or more sources of chemical additives (e.g., hydroxides) may be added to the produced water source within the DAC subsystem. In some embodiments, the sources of chemical additives may include a hydroxide source. The hydroxide source reacts with $CO_2$ to form carbonate salts. In some instances, the hydroxide source may be supplied from an external source; however, it may be advantageous to produce sources of chemical additives within the oil and gas production system itself.

With this in mind, in some embodiments of the present disclosure, the oil and gas production system may also include an electrolysis subsystem. The electrolysis subsystem may use a portion of the produced water source to generate an electrolysis hydroxide source. The electrolysis hydroxide source may provide at least a portion of the hydroxide to the DAC subsystem for use in dissolving $CO_2$ (i.e., capturing $CO_2$ from the air source as carbonate salts). In certain embodiments, the production system also includes a control system with one or more controllers (e.g., processor-based controllers) directed to control the DAC subsystem and/or the electrolysis subsystem. The control system may also monitor a water quality of the DAC water output. In some embodiments, a pH of the DAC water output may be monitored by the control system to assess an oxygen level of the DAC water output. In some instances, a presence of oxygen (e.g., above a threshold amount) in the DAC water output may increase the corrosivity of the DAC water output above a threshold suitable for reinjection into the reservoir. As such, in some embodiments, a scavenger source (e.g., oxygen scavenger) may be added to the DAC subsystem to further treat the DAC water source before reinjection into the reservoir. It should be noted, the presence of oxygen in the DAC water output may be due to a corrosiveness of the produced water source prior to contact with the air source. For example, the produced water source may have an oxygen concentration of approximately 5 ppb to 10 ppb prior to capture of $CO_2$ from the air source. In some instances, contact of the produced air source with $CO_2$ of the air source may increase the oxygen concentration of the produced water source by approximately 5 ppm.

In some embodiments, the DAC subsystem includes one or more contact towers. The contact towers may be used to directly capture $CO_2$ from the air source. For example, the contact towers may include a plurality of fans that direct the air source (e.g., passive capture) onto a column of the contact tower. A flow of the produced water source may be directed onto the column of the contact tower allowing $CO_2$ in the air source to directly dissolve (e.g., absorb) into the flow of the produced water source. In some embodiments, when the hydroxide source is introduced to the produced water source, a flow of hydroxide rich produced water is directed over the column of the contact tower leading to precipitation of $CO_2$ as carbonate salts into the DAC water output.

In certain embodiments, the contact towers may include a deaerator contact tower used to process the DAC water output before reinjection into the reservoir. The deaerator contact tower may remove dissolved gases (e.g., oxygen) from the DAC water output and/or a carbon rich water stream. Further, the deaerator contact tower may produce a treated air stream, an oxygen stream, a deaerated water stream, or a combination thereof. In context of the present application, any reference to carbon is intended to include any form of carbon captured by the DAC subsystem and/or dissolved in water (e.g., produced water, treated water, water outputs, and the like), including but not limited to $CO_2$, carbonates, carbonic acid, dissolved (e.g., absorbed) carbon dioxide, carbonate salts, or any combination thereof. As discussed below, implementation of the production system including the DAC subsystem, the electrolysis subsystem, the control system, or a combination thereof, within the context of oil and gas may be advantageous. It should be noted, however, that realization of the DAC subsystem, the electrolysis subsystem and the control system may be achieved in additional contexts, such as chemical production, pharmaceutical production, energy production and the like.

Figure 1:
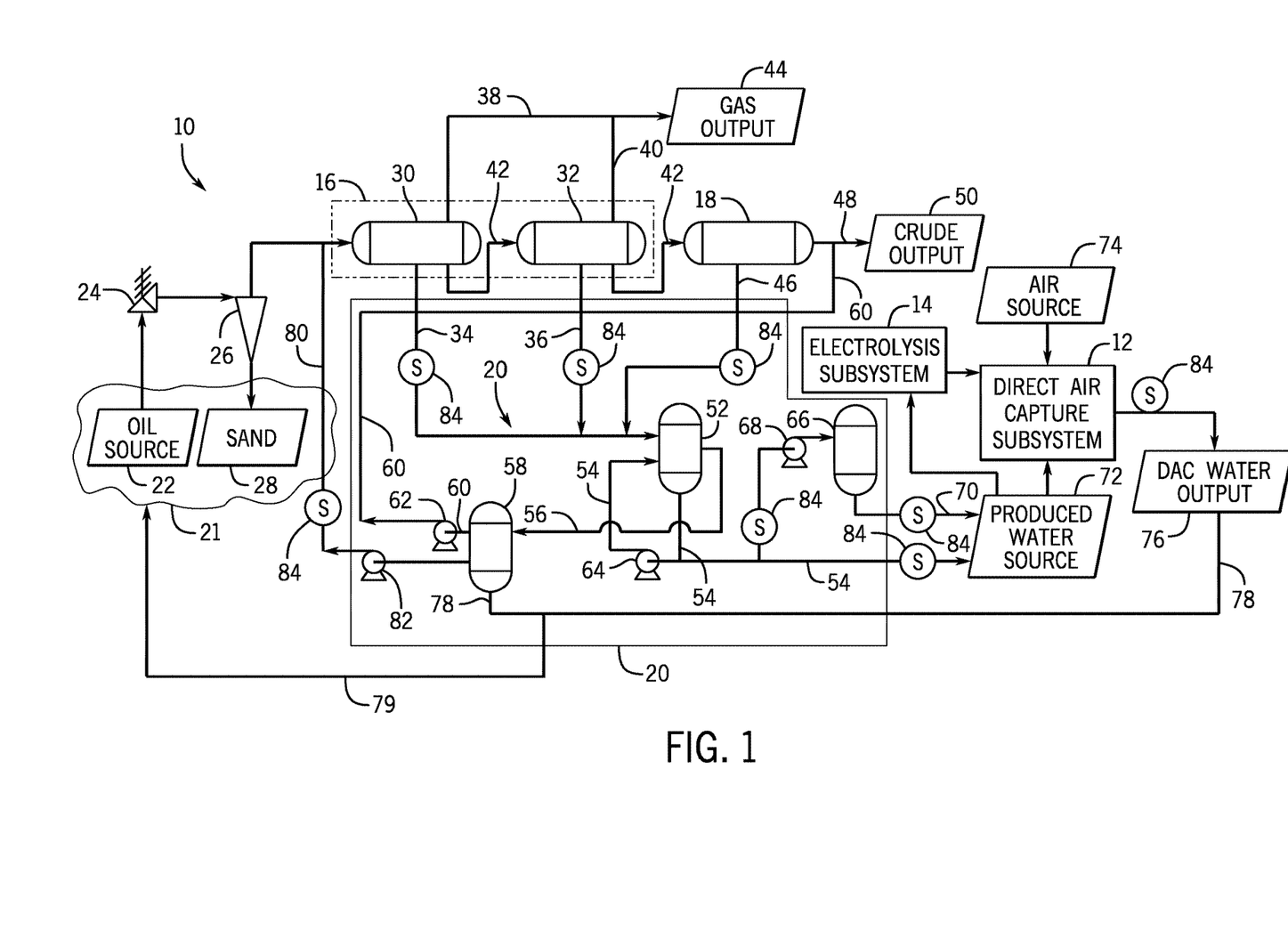
FIG. 1 is a schematic view of an oil and gas production system having a plurality of production subsystems, according to an embodiment of the present disclosure.

With the foregoing in mind, FIG. 1 is a schematic view of a production system 10 having a plurality of production subsystems. The production system 10 includes a direct air capture (DAC) subsystem 12, an electrolysis subsystem 14, a separator subsystem 16, a dehydration subsystem 18, and a water treatment subsystem 20. The production system 10, in the illustrated embodiment, is an oil and gas production facility. It should be noted, that the gas production facility is an illustrative example and other production systems are envisioned to leverage the embodiments disclosed herein.

In some embodiments, the production system 10 receives an oil source 22 (e.g., well production oil) from a reservoir 21 (e.g., subterranean geological reservoir) into a wellhead choke 24. The oil source 22 is directed through a wellhead desander 26 that removes sand 28 from the oil source 22. The sand 28 is then reintroduced into the reservoir 21. The oil source 22 continues to the separator subsystem 16. The separator subsystem 16 includes a high-pressure (HP) production separator 30 and a low-pressure (LP) production separator 32 configured to separate gases and liquids from the oil source 22. In some embodiment, the separator subsystem 16 separates crude oil, gas, and water. The HP and LP production separators 30 and 32 may include gravity separators, centrifugal separators, separators relying on changes in velocity, separators relying on changes in flow direction, or any combination thereof. In this manner, the separator subsystem 16 generates various water streams 34, 36, various gas streams 38, 40, and a crude oil stream 42. The production system 10 outputs the gas streams 38, 40 that produce a gas output 44. In certain embodiments, the gas output 44 may include natural gas. The gas output 44 may be used in other subsequent processes, such as in upstream, midstream, and/or downstream processes.

In certain embodiments, the crude oil stream 42 is directed to the dehydration subsystem 18. The dehydration subsystem 18 may further separate water from the crude oil stream 42 to generate a water stream 46 and a crude oil stream 48 to produce a crude output 50. For example, the dehydration subsystem 18 may include an electrostatic dehydrator configured to apply an electrostatic field to break an oil/water emulsion into the water stream 46 and the crude oil stream 48. The water stream 46 may have a higher salt content (e.g., compared to water streams 34, 36) due to the removal of salt from the crude oil stream 42. In some instances, the water streams 34, 36, 46 are directed to a vertical induced gas flotation (IGF) separator 52. The vertical IGF separator 52 may treat the water streams 34, 36, 46 to remove suspended materials, such as oils or solids, and generate a recycled water stream 54 and a skimmings stream 56. The skimmings stream 56 may comprise oils and solids and may be further processed through a filtration system 58 to produce a recycled oil stream 60. The recycled oil stream 60 may be directed by a pump 62 to produce crude output 50. The recycled water stream 54 may be directed back into the vertical IGF separator 52 via an IGF recycle pump 64. In some embodiments, the recycled water stream 54 may be directed to a cartridge filtration system 66 via a pump 68 to generate a filtered water stream 70. The filtered water stream 70 and the recycled water stream 54 output a produced water source 72.

In some embodiments, the produced water source 72 and an air source 74 is directed to the DAC subsystem 12, as discussed in further detail below. In brief, the DAC subsystem 12 produces a direct air capture (DAC) water output 76. The DAC water output 76 includes a carbon rich aqueous solution including dissolved carbon dioxide, carbonic acid, carbonate anions, bicarbonate anions, or a combination thereof. In some instances, a DAC stream 78 of the DAC water output 76 may be recycled within the production system 10. For example, the DAC stream 78 may be directed to the filtration system 58 and output as a recycled water stream 80 that may be directed to the separation subsystem 16 via a pump 82. In this manner, the DAC subsystem 12 may provide added benefit to water streams of the production system 10. In certain embodiments, a reinjection stream 79 may be injected into the reservoir 21. In some instances, the reinjection stream 79 may include a portion of the DAC stream 78. It should be noted, the reinjection stream 79 may be directed to an additional reservoir and/or reinjection location (e.g., body of water, and the like).

In certain embodiments, the electrolysis subsystem 14 receives at least a portion of the produced water source 72 upstream from the DAC subsystem 12. The electrolysis subsystem 14 may generate various outputs that may be provided to the DAC subsystem 12, as discussed in further detail below. As shown in the illustrated embodiment, the production system 10 may include one or more sensors 84.

The sensors 84 may be used to monitor various water streams 34, 36, 46, 80 of the production system 10. Further, in some instances, the sensors 84 may monitor the DAC water output 6 and/or various streams of the production system 10 during recycling. In this manner, the sensors 84 may output sensor feedback data indicative of one or more parameters of the various subsystems of the production system 10. For example, the sensors 84 may monitor an amount of oil in the water stream 34 and output the sensor feedback data including operational information related to the vertical IGF separator 52.

Figure 2:
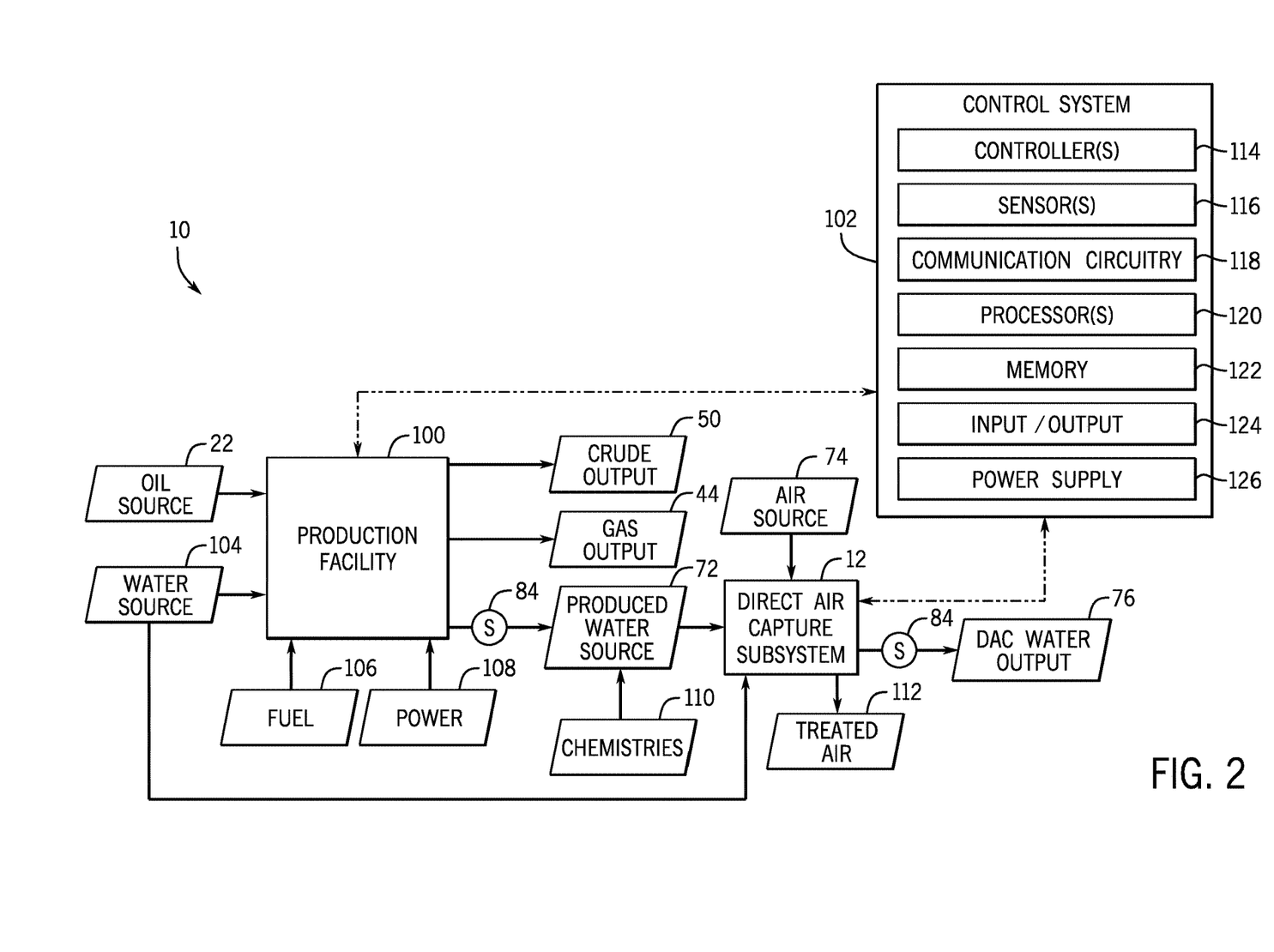
FIG. 2 is a block diagram of the oil and gas production system of FIG. 1 including a direct air capture subsystem, according to an embodiment of the present disclosure.

FIG. 2 is a block diagram of the production system 10 of FIG. 1 including a production facility 100, the DAC subsystem 12 and a control system 102. In some embodiments, the production facility 100 may include various subsystems as described above with reference to FIG. 1, such as the separator subsystem 16, the dehydration subsystem 18, the water treatment subsystem 20. For example, the production facility 100 may include all aspects of FIG. 1. In some embodiments, the production facility 100 may include various additional and/or alternative subsystems. The production facility 100 may receive the oil source 22 and a water source 104. In some embodiment, the oil source 22 may contain water that may be separated from oil. However, in some instances, the production facility 100 may acquire the water source 104 from a reservoir or other suitable body of water (e.g., lake, tank, ocean, river, and the like). The production facility 100 may also receive fuel 106 and power 108 to facilitate operation.

In some embodiments, the production facility 100 produces various outputs. The various outputs may include the crude output 50, the gas output 44, the produced water source 72, and the like. The produced water source 72 may be treated with one or more chemistries 110 (e.g., chemical sources, chemical streams, chemical processes). The chemistries 110 may include a hydroxide source, an oxygen scavenger source, a buffer source, or any combination thereof. The produced water source 72 may be directed to the DAC subsystem 12. The DAC subsystem 12, in some instances, may also receive the water source 104. The water source 104 may serve as an additional water source to the produced water source 72 and may be omitted in some embodiments of the present disclosure. In certain embodiments, the DAC subsystem 12 receives the air source 74. The air source 74 may be ambient air collected by one or more fans of the DAC subsystem 12. It should be noted, in some embodiments, the air source 74 may include and/or couple to a flue gas source. The flue gas source may contain $CO_2$. In some instances, the flue gas source may be produced by the production facility 100. In this manner, the DAC subsystem 12 may contact the air source 74 (e.g., ambient air, flue gas air source) with the produced water source 72 and/or the water source 104 to dissolve $CO_2$ from the air source into water, thereby capturing the $CO_2$ into the water. In this manner, the DAC subsystem 12 generates the DAC water output 76. The DAC water output 76 may include dissolved $CO_2$, carbonate salts, carbonic acid, and the like. As such, the DAC subsystem 12 outputs treated air 112. In some embodiments, the treated air 112 includes a lower concentration of $CO_2$ than the air source 74, as at least a portion of the $CO_2$ is removed by the DAC subsystem 12.

In some embodiments, the production system 10 includes the control system 102. The control system 102 includes various controllers 114 (e.g., processor-based controllers). The controllers 114 may be remote and/or local to the production system 10. The control system 102 may also include one or more sensors 116, a communication circuitry 118, one or more processors 120, a memory 122, an input/output (I/O) port 124, a power supply 126 (e.g., wired power, a battery), and the like. The communication circuitry 118 may facilitate wired or wireless communication between various components of the control system 102 and external devices, such as a mobile device, or central or local controllers of the production system 10. The processor(s) 120 may be any suitable type of computer processor or microprocessor capable of executing computer-executable code. Moreover, the processor(s) 120 may include multiple microprocessors, one or more "general-purpose" microprocessors, one or more special-purpose microprocessors, and/or one or more application specific integrated circuits (ASICS), or some combination thereof. For example, the processor(s) 120 may include one or more than one reduced instruction set (RISC) or complex instruction set (CISC) processors. In some embodiments, the processor(s) 120 may receive inputs (e.g., signals, sensor feedback data) from the DAC subsystem 12 (e.g., via the communication circuitry 118). For example, the sensor 84 may monitor a pH of the DAC water output 76 produced from the DAC subsystem 12 and control the chemistries 110 used to treat the produced water source 72 based on the sensor feedback data.

The memory 122 of the control system 102 may also be used to store instructions, data, various other software applications, and the like that are executed by the processor(s) 120. The memory 122 may represent non-transitory computer-readable media (e.g., any suitable form of memory or storage) that may store the processor-executable code used by the processor(s) 120 to perform various techniques described herein. The I/O ports 124 may be interfaces that may couple to other peripheral components such as input devices (e.g., keyboard, mouse), sensors, input/output (I/O) modules, and the like. The power supply 126 may provide power to one or more components of the control system 102. The components of the control system 102 may be coupled to the production facility 100, the DAC subsystem 12, or any other suitable component(s) of the production system 10.

As illustrated, the production system 10 includes one or more controllers 114 that communicate with and/or control data acquisition from the sensor(s) 84, 116. The sensor(s) 84, 116 may include flow meters, flow control device (e.g., choke), pressure meters, and saturation meters (e.g., carbon saturation level detector). During operation, the controller 114 may receive feedback from the sensor(s) 84, 116, such as one or more pressure sensors, one or more temperature sensors, one or more conductivity probes (e.g., conductivity sensors), and/or one or more optical sensors. In some embodiments, the pressure sensor and the temperature sensor may be combined (e.g., a pressure and temperature transmitter (PTTx)). Additionally, the controller 114 may receive feedback from the various flow meters (e.g., wet-gas flow meter, multi-phase flow meter). The controller 114 may be operatively coupled to sensor(s) 84, 116 and the flow meters via any suitable communication link, such as, for example, RS-422, RS-435, RS-485, Ethernet, controller area network (CAN) (e.g., CAN bus, CANopen), optical fibers, and/or wireless communication.

In some embodiments, sensor(s) 84, 116 on various pipelines of the production system 10 are used to monitor at least one parameter of the production system 10 (e.g., flow rate, temperature, pH, salinity, oxygen content, hydroxide content) of various water streams. As such, the at least one parameter is compared to a threshold (e.g., threshold flow rate, threshold temperature, threshold pH, threshold salinity, threshold oxygen content, threshold hydroxide content) to obtain a comparison of the parameters at various points in production. The controller 114 can control operation of the production system 10 based on the comparison of the at least one parameter measured by the sensor(s) 84, 116 against the threshold. For example, the controller 114 may selectively adjust the amount of the water source 104 pumped to the DAC subsystem 12 based on a flow of the produced water source received. As such, the controller 114 may adjust flow controls (e.g., pump, valve, etc.), or any combination thereof, depending on the comparison. If the comparison indicates a higher flow of the produced water source 72 exceeding a threshold (e.g., upper threshold), then the controller 114 may selectively decrease a speed of a pump controlling the flow of the water source 104. Likewise, if the comparison indicates a lower or decreasing flow of the produced water source 72 below a threshold (e.g., lower threshold), then the controller 114 may selectively engage or increase a speed of the pump controlling the flow of the water source 104.

Figure 3:
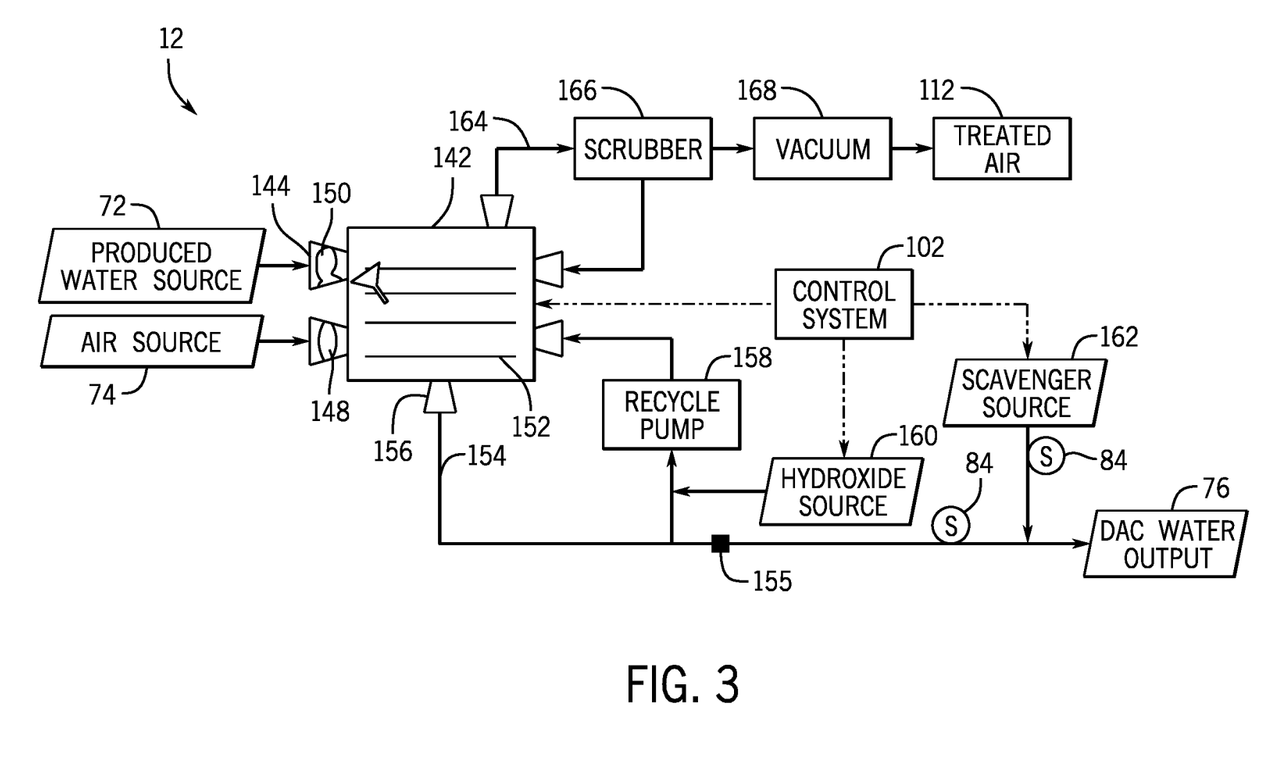
FIG. 3 is a schematic view of the direct air capture subsystem, further illustrating production of a direct air capture water output, according to an embodiment of the present disclosure.

FIG. 3 is a schematic view of an embodiment of the DAC subsystem 12, further illustrating production of the DAC water output 76. The DAC subsystem 12 includes one or more contact towers 142 (e.g., air-water contactors). As shown in the illustrated embodiment, the contact tower 142 receives the produced water source 72 and the air source 74 through one or more inlets 144 (e.g., an air inlet, a water inlet). In some instances, the inlet 144 of the air source 74 may include one or more fans 148. The fans 148 may pull the air source into the DAC subsystem 12. In some embodiments, the one or more inlets 144 may include a flue gas inlet coupled to a flue gas source alone or in combination with an air inlet coupled to an air source. In this manner, the one or more inlets 144 may direct one or more streams of air and/or flue gas produced by the production facility 100 into the DAC subsystem 12. It should be noted that the stream of flue gas may include an increased amount of $CO_2$ (e.g., compared to ambient air). In certain embodiments, the inlet 144 (e.g., water inlet) of the produced water source 72 may include a pump 150. The pump 150 may be configured to control the flow of the produced water source 72 into the contact tower 142. In this manner, the contact tower 142 directs the produced water source 72 onto one or more surfaces 152. The one or more surfaces 152 may include plastic surfaces, structured packing, corrugated packing, or any suitable surface. The surfaces 152 may have a large surface area to increase an air-water contact area of the contact tower 142. As such, the air source 74 may be directed onto the surfaces 152 to contact the produced water source 72. In this manner, the contact tower 142 facilitates solvent based capture of gaseous $CO_2$ within the air source 74 into the produced water source 72 (e.g., aqueous solvent).

The contact tower 142 outputs a carbon rich aqueous solution 154 (e.g., DAC water output 76) from an outlet 156. In some embodiments, the carbon rich aqueous solution 154 is pumped via a recycle pump 158 (e.g., a recycle loop) back into the contact tower 142 to provide additional water to dissolve $CO_2$ from the air source 74. In some embodiments, a hydroxide source 160 is introduced into the carbon rich aqueous solution 154. The hydroxide source 160 may increase an amount of $CO_2$ that the produced water source 72 and/or the carbon rich aqueous solution 154 can capture. It should be noted, prior to addition of the hydroxide source 160, the amount of $CO_2$ that is captured by the produced water source 72 is based on $CO_2$ solubility in water. The $CO_2$ captured based on solubility may exist in water as dissolved $CO_2$, carbonic acid, and the like. Solubility of $CO_2$ in water is based on salinity of the produced water source 72. The salinity of the produced water source 72 is based on processes of the production facility 100 in which it was produced. For example, a traditional oil and gas production facility may provide produced water with approximately 1% to 5% dissolved $CO_2$. However, it should be noted, that produced water is capable of having $CO_2$ soluble to approximately 40% to 60%. That is, the percent of $CO_2$ soluble in produced water is not maximized upon production of the produced water source 72 from the oil and gas production facility. As such, in a scenario where the traditional oil and gas production facility produces approximately 45,000 barrels (e.g., 6,032 metric tons) of produced water per day, the DAC subsystem 12 may capture approximately 1,915 tons (e.g., 1,764 metric tons) of $CO_2$ per year. In this scenario, the captured $CO_2$ accounts for approximately 12% of the total $CO_2$ produced by the traditional oil and gas production facility per year. It should be noted, that in some embodiments, it may be advantageous to control an amount of $CO_2$ captured by the produced water source 72 to be less than approximately 40%. In this manner, corrosivity of the DAC water output 76 may be managed to protect various downstream equipment.

In certain embodiments, the addition of the hydroxide source 160 may increase the ability of the produced water source 72 to capture $CO_2$ from the air source 74 by more than 7 times. That is, in some embodiments, the addition of the hydroxide source 160 to the produced water source 72 may substantially increase $CO_2$ capture. In some embodiments, the hydroxide source 160 contacts the produced water source 72 and/or the carbon rich aqueous solution 154 to increase an amount of hydroxide anions in the produced water source 72 and/or the carbon rich aqueous solution 154 producing a flow of hydroxide rich produced water. The increased amount of hydroxide anions may react with $CO_2$ in the air source 74 to form carbonates (e.g., carbonates, bicarbonates, etc.). In some embodiments, the carbonates are soluble in the DAC water output 76 of the DAC subsystem 12. Further, the solubility of the carbonates may be based on a temperature of the carbon rich aqueous solution 154. In this manner, it may be advantageous to control the temperature of the carbon rich aqueous solution 154 to ensure the carbonates do not precipitate out of the carbon rich aqueous solution 154. The solubility of carbonates in water is based on complex relationships between a mineral concentration (e.g., carbonates anions, hydroxides anions, cations, and the like) and temperature, and may include control of one or more components (e.g., hydroxide source 160, produced water source 72, air source 74, additional sources) of the DAC subsystem 12 to maintain solubility. In a non-limiting embodiment, the temperature of the carbon rich aqueous solution 154 may be controlled to allow the precipitation of the carbonates (e.g., generation of solid carbonates) from the carbon rich aqueous solution 154. As such, solid carbonates may be removed from the DAC subsystem 12 and further processed. In some embodiments, one or more filter(s) 155 (e.g., media filters, mechanical filters, zero gravity filters, and the like) may be used to remove precipitates (e.g., insoluble salts, and the like) from the carbon rich aqueous solution 154. For example, solid carbonates may be treated to regenerate a hydroxide recycle source and precipitate calcite using a causticization cycle. In this manner, thermal decomposition of calcite may be executed to produce lime and $CO_2$. As such, the $CO_2$ captured from the DAC subsystem 12 may be stored and/or used as a gas.

In certain embodiments, the hydroxide source 160 may include sodium hydroxide, calcium hydroxide, potassium hydroxide, manganese hydroxide and the like. In this manner, the carbonates produced in the carbon rich aqueous solution 154 may include sodium bicarbonate, calcium bicarbonate, potassium bicarbonate, magnesium bicarbonate, manganese bicarbonate, sodium carbonate, calcium carbonate, potassium carbonate, magnesium carbonate, manganese carbonate, or any combination thereof. In some embodiments, the carbon rich aqueous solution 154, the flow of hydroxide rich produced water, and/or the DAC water output 76 may become oxygenated (e.g., contain oxygen) due to contacting the air source 74 with the produced water source 72. In this manner, the DAC water output 76 may become corrosive (e.g., based on a pH and an alkalinity). To avoid reinjection of corrosive water, the DAC water output 76 may undergo treatment to reduce oxygen content of the DAC water output 76. As such, a scavenger source 162 may be added to the carbon rich aqueous solution 154 to scavenge dissolved oxygen. In some embodiments, the scavenger source 162 may include sulfites (e.g., sodium sulfite, potassium sulfite, sulfite blend), sulfides (e.g., sodium bisulfides), hydrogen, diethylhydroxylamine, or any combination thereof. Treatment of the carbon rich aqueous solution 154 with the scavenger source 162 may produce sulfates, and/or additional precipitates that may be removed from the DAC subsystem 12. In some embodiments, the carbon rich aqueous solution 154 may be deoxygenated by various processes (e.g., mechanically, chemically) that may include boiling, purging with nitrogen, sonication under reduced pressure, or any combination thereof.

In some embodiments, the contact tower 142 of the DAC subsystem 12 outputs a treated air stream 164. The treated air stream 164 may be directed to a scrubber assembly 166 and/or a vacuum assembly 168. In this manner, the scrubber assembly 166 may be controlled to remove any residual liquids of the treated air stream 164 from passing into the vacuum assembly 168. Further, the vacuum assembly 168 may output the treated air 112 having a lower $CO_2$ concentration than the air source 74. For example, the vacuum assembly 168 may be configured to create a vacuum to induce flow of the treated air 112. In some non-illustrative embodiments, the vacuum assembly 168 may include a chemical treatment assembly and/or a deaerator assembly used to remove residual of the treated air stream 164. In certain embodiments, the control system 102 controls various components of the DAC subsystem 12, including but not limited to the contact tower 142, the hydroxide source 160, the scavenger source 162, or any combination thereof. For example, the control system 102 may control the scavenger source 162 to increase and/or decrease a concentration of scavenger (e.g., oxygen scavenger solution) introduced into the carbon rich aqueous solution 154 before the DAC water output 76 is output by the DAC subsystem 12 for reinjection (e.g., reinjection into a well or the reservoir). In this manner, the control system 102 may receive sensor data from one or more sensors 84 of the DAC subsystem 12 indicative of a pH, an alkalinity, and a temperature of the DAC water output 76. As such, the control system 102 may analyze complex relationships of the pH, the alkalinity, and the temperature of the DAC water output 76 to vary a flow of injection of the scavenger source 162 to control an oxygenation level of the DAC water output 76.

Figure 4:
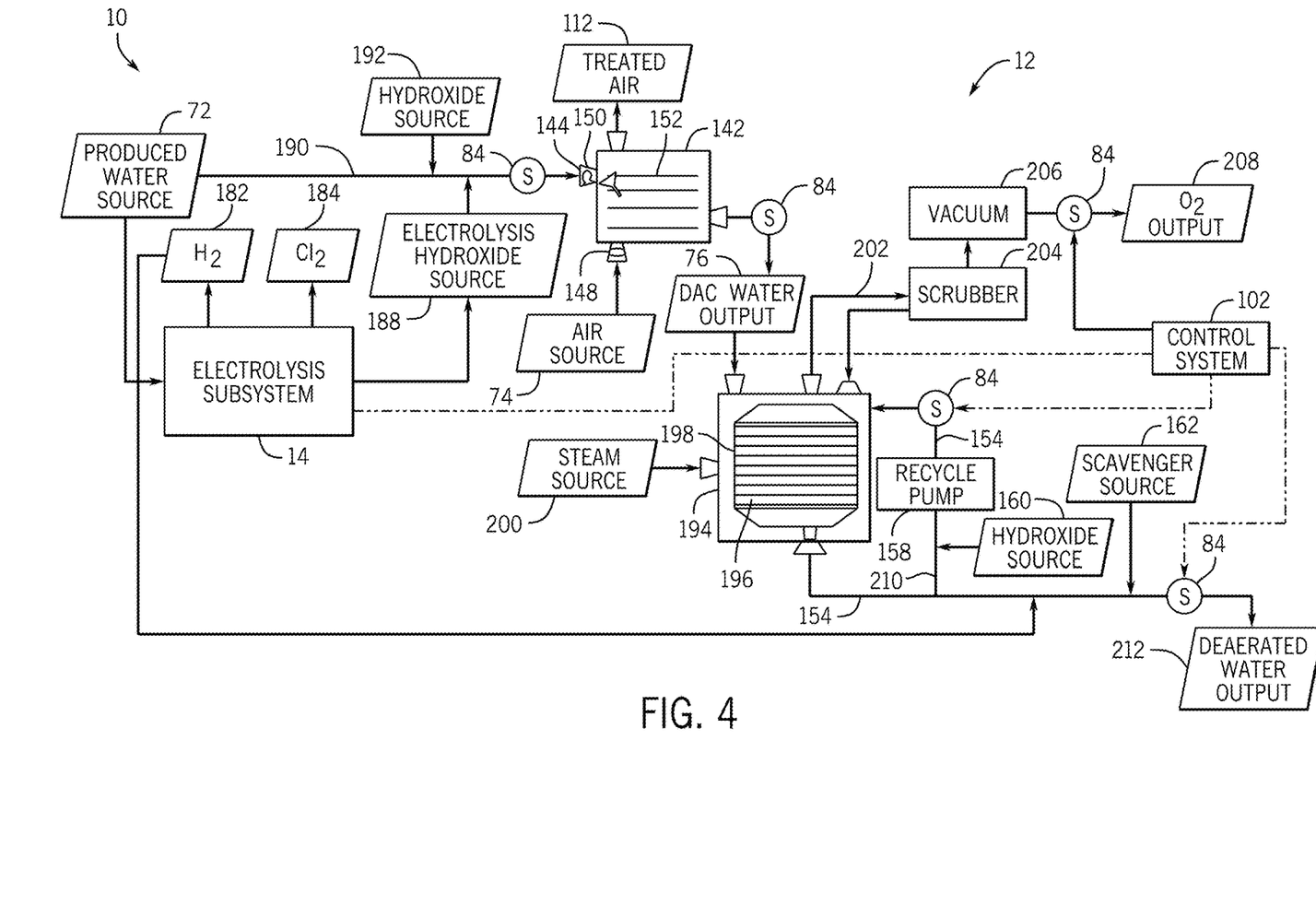
FIG. 4 is a schematic view of the oil and gas production system including the direct air capture subsystem and an electrolysis subsystem, according to an embodiment of the present disclosure.

FIG. 4 is a schematic view of an embodiment of the production system 10 including the DAC subsystem 12 and an electrolysis subsystem 14. In some embodiments, the electrolysis subsystem 14 may receive the produced water source 72 from the production system 10. As such, the electrolysis subsystem 14 may be controlled by the control system 102 to generate a hydrogen output 182, a chlorine output 184, an electrolysis hydroxide source 188, or a combination thereof. As described further below with reference to FIG. 5, the electrolysis subsystem 14 receives chloride salts and the produced water source 72. The electrolysis subsystem 14 electrolyzes the chloride salts and the produced water source 72 producing the hydrogen output 182 and the chlorine output 184 (e.g., chlorine gas). In some instances, the hydrogen output 182 may be directed to the DAC subsystem 12 to act as an oxygen scavenger. In this manner, the hydrogen output 182 may be used as at least a portion of the scavenger source 162 to deoxygenate the carbon rich aqueous solution 154 prior to reinjection into a reservoir.

In some embodiments, the electrolysis hydroxide source 188 (e.g., hydroxide salts) may be directed to the contact tower 142 of the DAC subsystem 12. The electrolysis hydroxide source 188 may provide the DAC subsystem 12 with at least a portion (e.g., at least 10, 20, 30, 40, 50, 60, 70, 80, 90, or 100 percent) of hydroxide needed to capture $CO_2$ from the air source 74. In this manner, the produced water source 72 may be made to include a flow of hydroxide rich produced water to flow through the contact tower 142, increasing the amount of $CO_2$ captured from the air source 74. It should be noted, a high salinity produced water source may remove additional $CO_2$ from the air source 74 compared to a low salinity produced water source. The air source 74 may be propelled into the contact tower 142 via various fans 148. In some embodiments, the control system 102 may monitor sensor feedback data from a sensor 84 positioned within a hydroxide stream 190 to determine if an additional hydroxide source 192 is needed to treat the produced water source 72 in addition to the electrolysis hydroxide source 188. For example, in some embodiments, the electrolysis subsystem 14 may produce an amount of hydroxide that satisfies a threshold amount of hydroxide needed to treat the produced water source 72 to capture $CO_2$ from the air source 74. In this manner, the control system 102 may control a valve to the additional hydroxide source 192 to close. In contrast, if the electrolysis subsystem 14 does not produce sufficient hydroxide to meet the threshold amount, then the control system 102 may control the valve to the additional hydroxide source 192 to open to a partially or fully opened position, depending on the amount of addition hydroxide source 192 needed to meet the threshold amount.

In some embodiments, the DAC subsystem 12 includes a deaerator contact tower 194 that receives the DAC water output 76 from the contact tower 142. The deaerator contact tower 194 may remove dissolved gases (e.g., oxygen) from the produced water source 72 and/or a carbon rich aqueous solution 154. The deaerator contact tower 194 may include one or more surfaces 196 within a column 198. The deaerator contact tower 194 may spray the DAC water output 76 over the surface 196 with one or more nozzles (e.g. spray nozzles). In this manner, spraying the DAC water output 76 onto the surfaces 196 creates a large surface area in which contact between the DAC water output 76 and a heat source is facilitated. In some instances, the heat source may be designed to boil off gases from the DAC water output 76. In some embodiments, the heat source may be a steam source 200. As such, transfer of heat between the DAC water output 76 and the steam source 200 is created producing a stream of gas 202 (e.g., noncondensable gas and some steam). In certain embodiments, the stream of gas 202 is directed towards a scrubber assembly 204 and a vacuum assembly 206 that remove additional fluids from the stream of gas 202 and produce an oxygen output 208. In some non-illustrative embodiments, the vacuum assembly 206 may include a chemical treatment assembly and/or a deaerator assembly used to remove residual of the stream of gas 202. In some instances, the stream of gas 202 may contain gases (e.g., nitrogen) in addition to the oxygen output 208. It should be noted, that the steam source 200 is one non-limiting embodiment and additional and/or alternative heat sources are envisioned to treat the DAC water output 76 in the contact tower 142. For example, the heat source may be a heated fluid (e.g., liquid or gas), an electric heater, a heat exchanger, and the like.

In some embodiments, treatment of the DAC water output 76 by the deaerator contact tower 194 may reduce an amount of the scavenger source 162 needed to remove oxygen from the carbon rich aqueous solution 154. In some embodiments, the scavenger source 162 may be omitted entirely. However, in some instances, further treatment of the carbon rich aqueous solution 154 is performed as discussed in reference to FIG. 3. In certain embodiments, the hydroxide source 160 is introduced to the carbon rich aqueous solution 154 in a bypass stream 210 of the deaerator contact tower 194 to increase the amount of $CO_2$ that can be captured in the DAC water output 76. The DAC subsystem 12 may output the carbon rich aqueous solution 154 after initial and/or recycled treatment and produce a deaerated water output 212. In some instances, the deaerated water output 212 may be the DAC water output 76. Further, it should be noted that the illustrated configuration of the DAC subsystem 12 may include any suitable combination of the illustrated components, and may include one or more additional contact towers, recycle loops, chemical processes, air treatment systems, and the like.

With this in mind, the sensor(s) 84 are used to monitor changes in a chemical content (e.g., $CO_2$ content, hydroxide content, scavenger content, and the like) of various flow paths of the production system 10. The sensor(s) 84 may analyze the threshold percentage of change in the chemical content (e.g., 0.5%, 1%, 5%, 10%) of the various flow paths by comparing data from the sensor(s) positioned before and after various subsystems (e.g., electrolysis subsystem 14, DAC subsystem 12) of the production system 10. For example, if the threshold percentage of change in the hydroxide content is less than 10%, then the control system 102 may increase a flow of the hydroxide source 160 and/or the additional hydroxide source 192. As such, the flow paths through various pumps and valves may be modulated to increase an amount of hydroxide in the produced water source 72.

Figure 5:
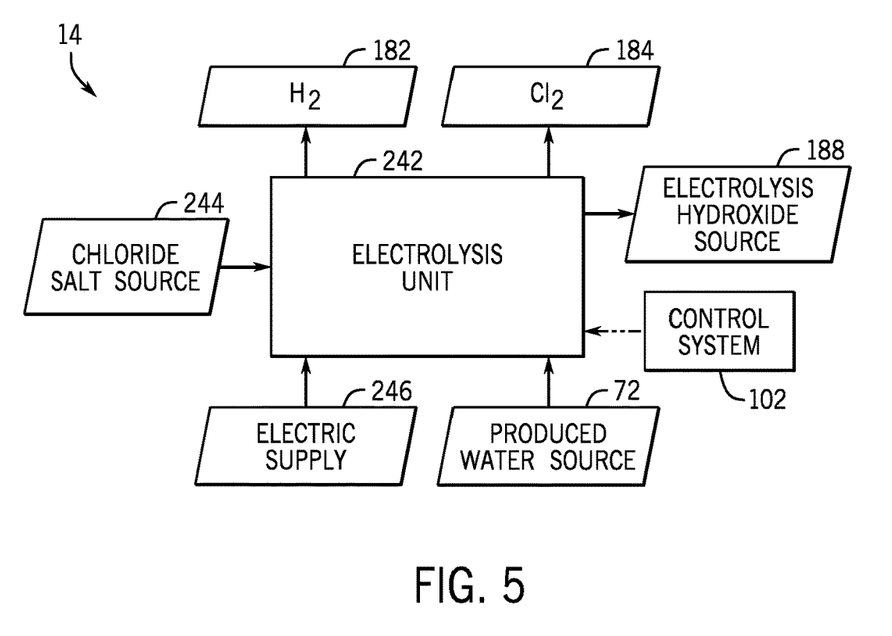
FIG. 5 a schematic view of the electrolysis subsystem of FIG. 4, according to an embodiment of the present disclosure.

FIG. 5 is a schematic view of the electrolysis subsystem 14 of FIG. 4. In some embodiments, the electrolysis subsystem 14 includes an electrolysis unit 242 that electrolyzes the produced water source 72. In some instances, the produced water source 72 of the production system 10 may include various chloride salts used by the electrolysis unit 242. Additionally and/or alternatively, the electrolysis unit 242 may receive a chloride salt source 244. The chloride salt source 244 and/or the chloride salts of the produced water source 72 may include sodium chloride, calcium chloride, potassium chloride, magnesium chloride, manganese chloride, or any combination thereof. In this manner, the electrolysis unit 242 may receive an electric supply 246 (e.g., low voltage, high current) to electrolyze the produced water source 72 and the chloride salt source 244.

In general, electrolysis of water occurs as electrons travel through an electrolytic cell within the electrolysis unit 242 during electrical induction. As such, the electrolysis unit 242 may include an anode and a cathode. Further, the electrolysis unit 242 may generate an oxygen stream at the anode (e.g., oxidation reaction) and generate the hydrogen output 182 at the cathode (e.g., reduction reaction). Further, the electrolysis unit 242 may include the chloride salt source 244 as an electrolyte. In some instances, the electrolyte may include ionic salts (e.g., sodium chloride, calcium chloride, magnesium carbonate, magnesium sulfate, sodium hydroxide), mixed salts, strong acids (e.g., sulfuric acid, hydrochloric acid), strong bases (e.g., sodium hydroxide), and/or ionic solutes (e.g., sulfuric acid, sodium sulfate) to increase electrical conductivity within the electrolytic cell.

The electrolysis unit 242 may produce the hydrogen output 182, the oxygen stream, and the chlorine output 184 using various electrolysis production techniques (e.g., techniques that can perform non-spontaneous reactions or $\Delta G < 0$). In some embodiments, the electrolysis unit 242 may include suitable components for performing proton exchange membrane electrolysis with solid polymer electrolytes (e.g., lithium phosphorus oxynitride, lithium thiophosphates) to separate the produced water source 72. In some embodiments, the electrolysis unit 242 may include suitable components for performing alkaline electrolysis with liquid alkaline electrolytes (e.g., potassium hydroxide, sodium hydroxide). In any case, the electrolysis unit 242 may produce the hydrogen output 182, the chlorine output 184, the electrolysis hydroxide source 188, or a combination thereof, that may advantageously be used in further chemical processes (e.g., direct air capture by the DAC subsystem 12).

It should be noted that a salinity of the produced water source 72 may be related to an API (American Petroleum Institute) rating of the oil being produced. For example, light oils (e.g., high API rating) typically generate a produced water source with high salinity, while heavy oils (e.g., low API rating) typically generate a produced water source with low salinity. With this in mind, a concentration and/or an identity of chloride salts within the produced water source may impact an amount of the electrolysis hydroxide source 188 produced. Further, a conversion efficiency of the electrolysis unit 242 may determine a relationship between a volume of water electrolyzed and the amount of the electrolysis hydroxide source 188 produced. In this manner, in some embodiments, it may be advantageous to electrolyze approximately 100% of the produced water source 72 of the production system 10 to produce an amount of hydroxide needed to subsequently capture $CO_2$ in the DAC subsystem 12.

Figure 6:
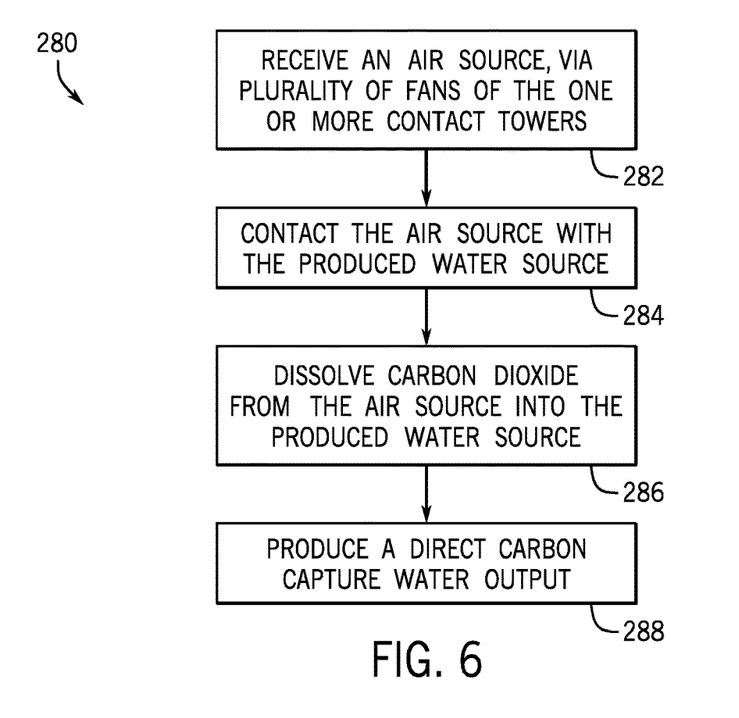
FIG. 6 is a flowchart of an example process for operation of the direct air capture subsystem of FIG. 3, according to an embodiment of the present disclosure.

FIG. 6 is a flowchart of an embodiment of a process 280 for operation of the DAC subsystem 12 of the present disclosure. In some embodiments, a production system is operated to generate a produced water source. The produced water source may then be used by a direct air capture subsystem to capture $CO_2$ from the atmosphere. A flow of produced water may be directed to the DAC subsystem 12 through a water inlet. The direct air capture subsystem may include one or more contact towers. The process 280 at block 282 may receive a flow of air including $CO_2$ via a plurality of fans of the contact towers and/or an air inlet. The air source may be ambient air and/or a produced air source from the production facility (e.g., flue gas). In some instances, the air source may include undesirable gases (e.g. $CO_2$). At block 284, the process 280 may contact the air source with the produced water source of the production system. In some embodiments, the air source is contacted with the produced water source on surfaces within a column of the contact towers. In some instances, the air source may be controlled to contact the produced water source at various times.

At block 286, the produced water source sequesters $CO_2$ from the air source. In some embodiments, the $CO_2$ is sequestered based on the solubility of the $CO_2$ in the produced water source. In certain embodiments, the produced water source is treated with a hydroxide source to increase $CO_2$ capture by the produced water generating carbonates within an aqueous solution of the produced water source. In this manner, a flow of hydroxide rich produced water may be contacted with the air source in the contact towers. Accordingly, additional $CO_2$ may be captured from the air source before the direct air capture system outputs a treated air. In some instances, the treated air has a lower concentration of $CO_2$ than the air source. At block 288 of the process 280, the direct air capture system may produce a direct carbon capture water output. The direct carbon capture water output may include dissolved carbon dioxide, carbonic acid, carbonate anions, bicarbonate anions, or a combination thereof. In this manner, the direct air capture may reduce the amount of atmospheric $CO_2$ through capture of $CO_2$ in the produced water stream. In some instances, the reduction of atmospheric $CO_2$ may allow the production system to approach carbon neutrality.

A technical effect of the disclosed embodiments includes direct air capture of undesirable gases (e.g., $CO_2$) using water (e.g., produced water) from a production system, such as an oil and gas production system. Thus, the produced water from the production system, which may otherwise have no additional use, supports the direct air capture to improve the quality of atmospheric air by removing the undesirable gases. A DAC subsystem of the production system may dissolve the undesirable gases into the water to produce a DAC water output, wherein the DAC water output may be injected into a reservoir (e.g., subterranean geological reservoir), recycled through the production system, and/or further processed to separate the undesirable gases from the produced water. Another technical effect of the disclosed embodiments is the on-site generation of chemicals (e.g., hydroxide source) to further improve the efficiency of the DAC subsystem, thereby further improving the capacity of the DAC subsystem to capture the undesirable gases from the atmospheric air. Thus, rather than relying entirely on an external source of chemicals, the on-site generation of chemicals reduces the chemical costs while improving the capacity of the DAC subsystem.

The subject matter described in detail above may be defined by one or more clauses, as set forth below.

A system including a direct air capture (DAC) subsystem. The DAC subsystem includes an air inlet configured to receive a flow of air comprising carbon dioxide, a water inlet configured to receive a flow of produced water from a production system. The DAC subsystem also includes one or more air-water contactors configured to contact the flow of air with the flow of produced water to dissolve carbon dioxide from the air into the produced water to produce a treated air and a water output, wherein the water output comprises a carbon rich aqueous solution comprising dissolved carbon dioxide, carbonic acid, carbonate anions, bicarbonate anions, or a combination thereof.

The system of the preceding clause, wherein the DAC subsystem includes a hydroxide source configured to supply an amount of hydroxide into the produced water and/or the water output to produce a flow of hydroxide rich produced water.

The system of any preceding clause, wherein the DAC subsystem is configured to remove additional carbon dioxide from the air by contacting the flow of air with the flow of hydroxide rich produced water, wherein the flow of hydroxide rich produced water is configured to precipitate the additional carbon dioxide from the air into carbonate salts.

The system of any preceding clause, comprising a recycle loop coupled to the one or more water contactors, wherein the DAC subsystem is configured to supply the amount of hydroxide into the water output in the recycle loop to produce the flow of hydroxide rich produced water.

The system of any preceding clause, wherein the DAC subsystem comprises a scavenger source, wherein the scavenger source is configured to supply a flow of an oxygen scavenger to remove oxygen from the water output and increase a pH of the water output.

The system of any preceding clause, wherein the DAC subsystem comprises a deaerator downstream from the one or more air-water contactors.

The system of any preceding clause, comprising the production system, wherein the DAC subsystem is configured to recycle at least a portion of the water output into the production system.

The system of any preceding clause, comprising an electrolysis subsystem configured to receive the flow of produced water and produce an electrolysis hydroxide source, a hydrogen output, a chlorine output, or a combination thereof.

The system of any preceding clause, wherein at least a hydroxide source of the DAC subsystem comprises the electrolysis hydroxide source.

The system of any preceding clause, wherein at least a portion of a scavenger source comprises the hydrogen output of the electrolysis subsystem.

A method including operating a production system to generate a flow of produced water, wherein the production system comprises a direct air capture (DAC) subsystem. The DAC subsystem includes one or more air-water contactors, controlling the DAC subsystem to receive a flow of air via an air inlet into the one or more air-water contactors, receive the flow of produced water via a water inlet into the one or more air-water contactors, and dissolve carbon dioxide from the air into the produced water via the one or more air-water contactors to produce a treated air and a water output, wherein the water output comprises a carbon rich aqueous solution comprising dissolved carbon dioxide, carbonic acid, carbonate anions, bicarbonate anions, or a combination thereof.

The method of the preceding clause, comprises monitoring one or more parameters of the DAC subsystem via one or more sensors configured to output sensor feedback data, wherein the sensor feedback comprises a pH, an oxygen level, a parameter of a hydroxide source, a quality of the water output, or a combination thereof.

The method of any preceding clause, including receiving, via the production system, a portion of the produced water, wherein the produced water comprises chloride salts, and electrolyzing, via an electrolysis subsystem, the portion of the produced water to generate a hydrogen output, a chlorine output, and an electrolysis hydroxide source.

The method of any preceding clause, including receiving, via the electrolysis subsystem, the electrolysis hydroxide source, controlling, via the DAC subsystem, contacting the electrolysis hydroxide source with the produced water to generate a flow of hydroxide rich produced water, and recycling, via the DAC subsystem, the flow of hydroxide rich produced water through the one or more air-water contactors. The method also including contacting, via the one or more air-water contactors, the flow of hydroxide rich produced water with the air, and precipitating carbon dioxide from the air into carbonate salts within the water output.

The method of any preceding clause including receiving, via the electrolysis subsystem, the hydrogen output, wherein the hydrogen output is an oxygen scavenger and controlling, via the DAC subsystem, contacting the hydrogen output with the water output to increase a pH of the water output.

The method of any preceding clause including supplying the water output into a subterranean geological reservoir.

A system including a direct air capture (DAC) subsystem, wherein the DAC subsystem includes an air inlet configured to receive a flow of air comprising carbon dioxide. The DAC subsystem also includes a water inlet configured to receive a flow of produced water from a production system and one or more air-water contactors configured to contact the flow of air with the flow of produced water to capture carbon dioxide from the air into the produced water to produce a treated air and a water output, wherein the water output comprises a carbon rich aqueous solution comprising dissolved carbon dioxide, carbonic acid, carbonate anions, bicarbonate anions, or a combination thereof; and an electrolysis subsystem, wherein the electrolysis subsystem is configured to receive the flow of produced water and produce an electrolysis hydroxide source, a hydrogen output, a chlorine output, or a combination thereof.

The system of the preceding clause, wherein the DAC subsystem is configured to increase the capture of the carbon dioxide from the air into the produced water using the electrolysis hydroxide source.

The system of any preceding clause, wherein at least a portion of carbon dioxide that is captured into the water output is based on a solubility of the carbon dioxide in the produced water.

The system of the preceding clause, including a control system. The control system includes one or more sensors configured to monitor a parameter of the DAC subsystem and/or the electrolysis subsystem and output sensor feedback, wherein the sensor feedback comprises a pH, an oxygen level, a parameter of a hydroxide source, a quality of the water output, or a combination thereof. The control system also includes one or more controllers configured to control the DAC subsystem and the electrolysis subsystem based on the sensor feedback.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
   a direct air capture (DAC) subsystem, wherein the DAC subsystem comprises:
      an air inlet configured to receive a flow of air comprising carbon dioxide;
      a water inlet configured to receive a flow of produced water from a production system;
      one or more air-water contactors configured to contact the flow of air with the flow of produced water to dissolve the carbon dioxide from the flow of air into the produced water to produce a treated air and a water output, wherein the water output comprises a carbon rich aqueous solution comprising dissolved carbon dioxide, carbonic acid, carbonate anions, bicarbonate anions, or a combination thereof;
      a deaerator downstream from the one or more air-water contactors, wherein the deaerator is configured to receive the water output of the one or more air-water contactors;
      a first hydroxide source configured to supply a first amount of hydroxide into the produced water, the water output, or a combination thereof to produce a flow of hydroxide rich produced water from the one or more air-water contactors; and
      a second hydroxide source configured to supply a second amount of hydroxide into a bypass stream of the deaerator to produce a flow of hydroxide rich deaerated water.

2. The system of claim 1, wherein the DAC subsystem is configured to remove additional carbon dioxide from the flow of air by contacting the flow of air with the flow of hydroxide rich produced water, wherein the flow of hydroxide rich produced water is configured to precipitate the additional carbon dioxide from the flow of air into carbonate salts.

3. The system of claim 1, further comprising a recycle loop coupled to the one or more air-water contactors, wherein the DAC subsystem is configured to supply the first amount of hydroxide into the water output in the recycle loop to produce the flow of hydroxide rich produced water.

4. The system of claim 1, wherein the DAC subsystem further comprises a scavenger source, wherein the scavenger source is configured to supply a flow of an oxygen scavenger to remove oxygen from the water output.

5. The system of claim 1, further comprising the production system, wherein the DAC subsystem is configured to recycle at least a portion of the water output into the production system.

6. The system of claim 1, wherein the first hydroxide source is an electrolysis hydroxide source produced by an electrolysis subsystem configured to receive the flow of produced water.

7. The system of claim 6, wherein at least a portion of a scavenger source comprises the hydrogen output of the electrolysis subsystem.

8. The system of claim 1, wherein the flow of air comprising carbon dioxide further includes a flue gas.

9. A system comprising:
   a direct air capture (DAC) subsystem, wherein the DAC subsystem comprises:
      an air inlet configured to receive a flow of air comprising carbon dioxide;
      a water inlet configured to receive a flow of produced water from a production system; and
      one or more air-water contactors configured to contact the flow of air with the flow of produced water to dissolve the carbon dioxide from the flow of air into the produced water to produce a treated air and a water output, wherein the water output comprises a carbon rich aqueous solution comprising dissolved carbon dioxide, carbonic acid, carbonate anions, bicarbonate anions, or a combination thereof;

an electrolysis subsystem, wherein the electrolysis subsystem is configured to receive the flow of produced water and produce a first electrolysis hydroxide source configured to supply a first amount of hydroxide into the produced water;

a second hydroxide source configured to supply a second amount of hydroxide into the produced water;

a valve configured to control a flow of the second hydroxide source;

one or more sensors configured to monitor a parameter of the DAC subsystem, the electrolysis subsystem, and/or the second hydroxide source and output sensor feedback data, wherein the sensor feedback data comprises a pH, an oxygen level, a parameter of the first electrolysis hydroxide source, a parameter of the second hydroxide source, a quality of the water output, or a combination thereof; and a control system comprising one or more controllers configured to control the DAC subsystem, the electrolysis subsystem, and the valve based on the sensor feedback data.

10. The system of claim 9, wherein the DAC subsystem is configured to increase an amount of the carbon dioxide dissolved into the produced water from the flow of air using the electrolysis hydroxide source.

11. The system of claim 9, wherein at least a portion of the carbon dioxide that is dissolved into the water output is based on a solubility of the carbon dioxide in the produced water.

12. The system of claim 9, wherein the control system is configured to:
determine whether the electrolysis hydroxide subsystem has produced a threshold amount of the first amount of hydroxide to treat the produced water;
close the valve when the first amount of hydroxide meets or exceeds the threshold amount; and
open the valve when the first amount of hydroxide is less than the threshold amount.

* * * * *